United States Patent [19]

Mackoway, Jr. et al.

[11] Patent Number: 5,205,538
[45] Date of Patent: Apr. 27, 1993

[54] DETENT MECHANISM FOR A FLUID CONTROL VALVE

[75] Inventors: John P. Mackoway, Jr., Washington; Charles E. Holzinger, Peoria, both of Ill.

[73] Assignee: Caterpillar Inc., Peoria, Ill.

[21] Appl. No.: 803,847

[22] Filed: Dec. 9, 1991

[51] Int. Cl.$^5$ ............................................. F16K 31/00
[52] U.S. Cl. ..................................... 251/297; 74/527; 74/531
[58] Field of Search ................... 251/297; 137/624.27; 74/531, 527

[56] References Cited

U.S. PATENT DOCUMENTS

| | | | |
|---|---|---|---|
| 2,870,553 | 1/1959 | Temple | 37/144 |
| 3,040,772 | 6/1962 | Todd | 137/624.27 O X |
| 3,165,120 | 1/1965 | Horowitz | 251/297 X |
| 3,640,146 | 2/1972 | Barnes | 137/624.27 X |
| 3,774,470 | 11/1973 | Cottin | 74/527 |
| 4,339,987 | 7/1982 | Stephenson et al. | 91/426 |

Primary Examiner—Alan Cohan
Attorney, Agent, or Firm—John W. Grant

[57] ABSTRACT

Detent mechanisms are useful for retaining a stem of a control valve at predetermined operating positions. The ball type detents commonly used in control valves tend to slide thereby causing the operator to extend additional energy to overcome the sliding friction. The subject detent mechanism includes a roller rotatably disposed on a pin carried by a roller carrier. The roller has an annular arcuate surface in rolling contact with the peripheral surface of the stem. The arcuate surface increases the contact surface between the roller and the stem to thereby insure that the roller rolls on the stem and minimizes the lever effort necessary to move the stem.

8 Claims, 1 Drawing Sheet

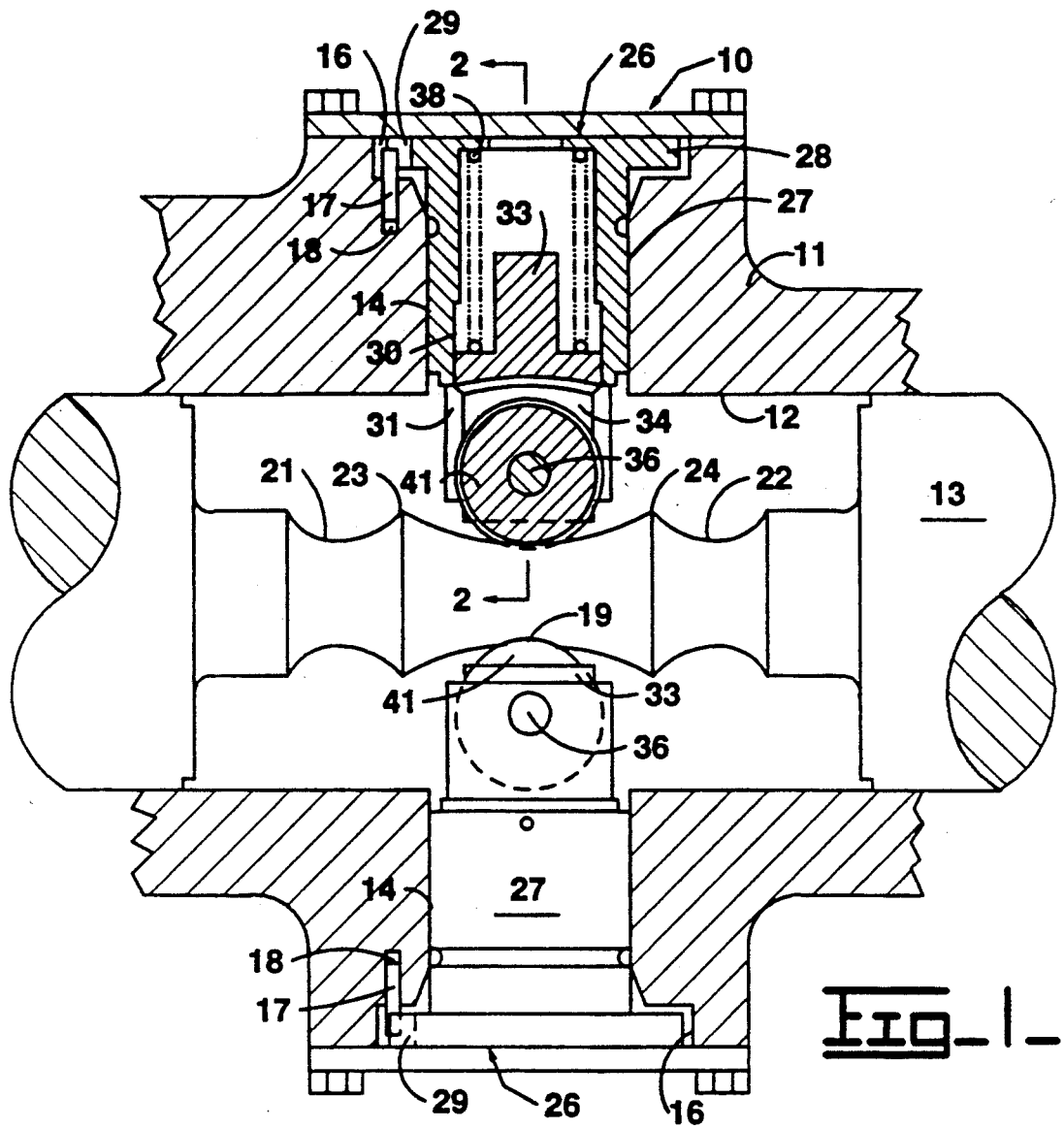
Fig_1_
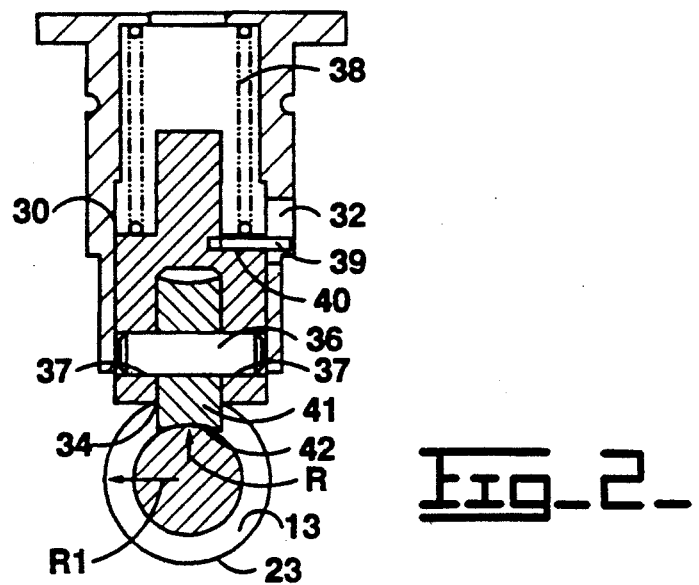
Fig_2_

5,205,538

DETENT MECHANISM FOR A FLUID CONTROL VALVE

DESCRIPTION

1. Technical Field

This invention relates to a fluid control valve and more particularly to a cartridge detent mechanism for such fluid control valves.

2. Background Art

Detent devices are frequently used to retain a spool of a control valve in a selected operating position. One commonly used type of detent device has a hardened ball contained within a cartridge fitted in a valve body adjacent the spool. The ball is resiliently urged into engagement with the spool and cooperates with a cam or ramp surface on the spool to hold the spool in the selected position. One of the problems discovered with such ball type detent devices is that the balls frequently do not roll on the valve spool as expected but tend to slide along the spool. The sliding action increases the lever effort necessary to move the spool such that operation of the control valve is fatiguing to the operator. Also such ball type detents do not provide a distinct feel to the operator when the spool reaches the selected operating position The present invention is directed to overcoming one or more of the problems as set forth above.

DISCLOSURE OF THE INVENTION

In one aspect of the present invention, a cartridge type detent mechanism includes a cylindrical housing having an axially extending bore therein. A roller carrier is slidably positioned in the bore and carries a pin. A spring is disposed in the bore and resiliently biases the carrier outwardly of the bore. A roller is rotatably disposed on the pin and has an annular arcuate surface at its outer periphery.

The element of the detent mechanisms that contact the spool preferably should roll along the spool to minimize the lever efforts required to move the spool and provide a more positive snappy feel as the spool reaches the selected operating position.

BRIEF DESCRIPTION OF THE DRAWINGS

FIG. 1 is a sectional view through a control valve encompassing an embodiment of the present invention; and FIG. 2 is a sectional view taken along line 2—2 of FIG. 1.

BEST MODE FOR CARRYING OUT THE INVENTION

Referring to the drawing, a control valve 10 includes a body 11 having a longitudinally extending bore 12 therein and a valve stem 13 slidably disposed within the bore 12. The body has a pair of axially aligned bores 14 disposed on opposite sides of and opening into the bore 12. The body also includes a pair of outwardly extending counterbores 16 concentric with the bores 14. A pair of alignment pins 17 are suitably secured within a pair of holes 18 formed in the body with the pins extending into the counterbores 16. The stem 13 includes a reduced diameter annular groove 19 positioned between and separated from a pair of annular detent grooves 21,22 by a pair of annular ridges 23,24.

A pair of cartridge detent mechanisms 26 are operatively associated with the control valve 10 for retaining the valve stem 13 at preselected positions. Each of the detent mechanisms 26 includes a cylindrical housing 27 disposed within the bore 14. The housing 27 has an annular flange 28 at the outer end thereof. The pin 17 extends into a notch 29 in the flange 28. The housing has a cylindrical bore 30 opening toward the stem 13, a guide slot 31 in the end portion adjacent the stem 13, and a hole 32 opening into the bore 30.

A roller carrier 33 is slidably disposed within the bore 30 and has a roller receiving slot 34 opening toward the stem 13. A pin 36 is carried by the roller carrier and extends into axially aligned holes 37 in the carrier. A spring 38 is disposed in the bore 30 and resiliently biases the carrier toward the stem. A retainer pin 39 is fixedly disposed within a hole 40 in the roller carrier 33 with a portion thereof extending into the hole 32 in the housing.

An annular roller 41 is rotatably disposed on the pin 36 within the slot 31 and extends into the guide slot 34. The roller 41 has an annular concave surface 42 at its periphery. The concave surface has a radius R which substantially matches a radius R1 of the annular ridges 23,24.

INDUSTRIAL APPLICABILITY

The pins 17 cooperate with the notches 29 to properly orient the detent mechanisms 26 in the bores 14 so that the rollers 41 are substantially parallel to the stem 13. Similarly, the retaining pins 39 retain the carrier 33 within the housing 27 during assembly of the detent mechanism into the bore 14. The rollers 41 are resiliently urged into physical contact with the stem 13 by the spring 38. The annular surfaces 42 of the rollers cooperate with the stem to maintain the rollers in parallel alignment with the stem.

In operation, movement of the stem 13, for example to the right from the neutral position as shown in the drawing, causes the rollers 41 to ride up the annular ridges 23 causing the roller carriers 33 to be urged away from the stem against the bias of the springs 38. As the annular ridge 23 passes between the rollers 41 and beyond, the springs 38 urge the spring carriers toward the stem so that the rollers seat in the annular detent groove 21 to hold the stem at an operating position. As the rollers pass over the annular ridge 23, a snap action is provided to provide a distinct feel to the operator indicating that the stem is approaching the detented operating position. The stem 13 is moved from the detented position by physical movement of the stem 13 in the opposite direction.

In view of the foregoing description, it is readily apparent that the present invention provides an improved cartridge detent mechanism which reduces operator effort necessary to move the stem into and out of the detented positions. The concave surface of the roller provides increased surface contact between the roller and the stem thereby insuring that the roller rotates on the pin and substantially eliminates any sliding action between the roller and the stem.

Other aspects, objects, and advantages of this invention can be obtained from a study of the drawing, the disclosure, and the appended claims.

We claim:

1. A cartridge detent mechanism comprising:
a housing having an axially extending bore;
a roller carrier slidably positioned in the bore;
a pin carried by the roller carrier;

a spring disposed in the bore and resiliently biasing the carrier outwardly of the bore; and a roller rotatably disposed on the pin and having an annular concave peripheral surface.

2. The cartridge detent mechanism of claim 1 wherein the roller carrier includes a slot, the roller being positioned within the slot.

3. The cartridge detent mechanism of claim 2 wherein the housing has a guide slot and the roller extends into the guide slot.

4. The cartridge detent mechanism of claim 3 wherein the housing has a hole opening into the bore and including a retainer pin fixed to the roller carrier and extending into the hole.

5. A cartridge detent mechanism for a fluid control valve having a body, a stem receiving bore extending through the body, a detent mechanism receiving bore opening into the stem receiving bore, and a valve stem slidably disposed in the stem receiving bore and movable between a neutral position and at least one operating position and having an annular detent groove adjacent the detent mechanism receiving bore, the detent mechanism comprising:

a housing disposed in the detent mechanism receiving bore and having an axially extending bore opening toward the stem;

a roller carrier slidably positioned in the bore of the housing;

a pin carried by the roller carrier;

a spring disposed in the housing bore, and resiliently biasing the carrier toward the stem; and a roller rotatably, disposed on the pin and having an annular concave peripheral surface in rolling contact with the stem.

6. The cartridge detent mechanism of claim 4 wherein the roller carrier includes a slot opening toward the stem, the roller being positioned within the slot.

7. The cartridge detent mechanism of claim 4 wherein the housing has a guide slot and the roller extends into the guide slot.

8. The cartridge detent mechanism of claim 7 wherein the housing has a hole opening into the bore of the housing and including a retainer pin fixed to the roller carrier and extending into the hole.

* * * * *